W. E. WILLIAMS.
UNIVERSAL JOINT FOR POWER SHAFTS.
APPLICATION FILED MAY 24, 1916.
1,225,199.
Patented May 8, 1917.
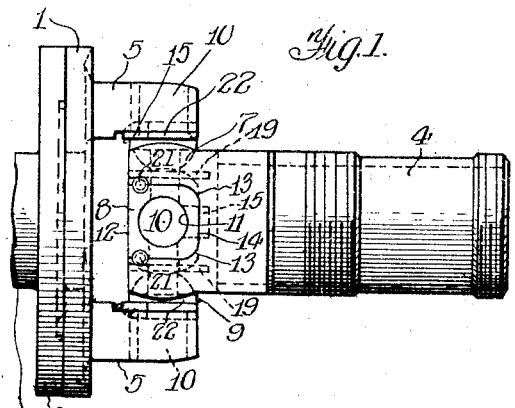
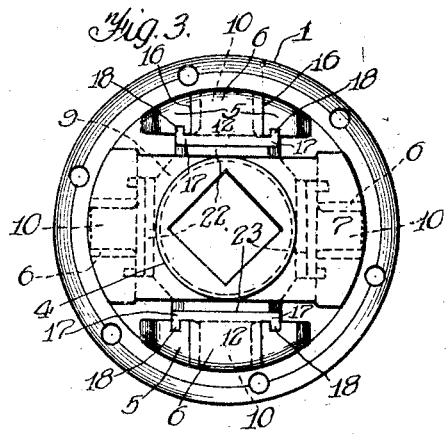
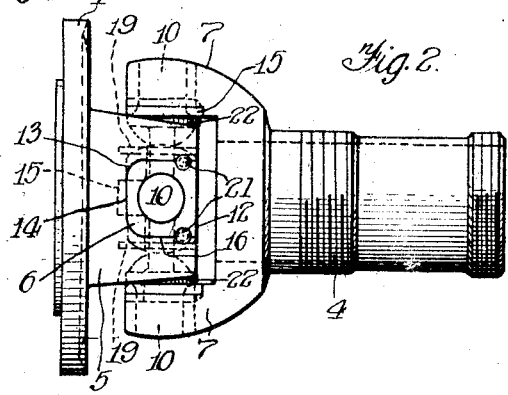
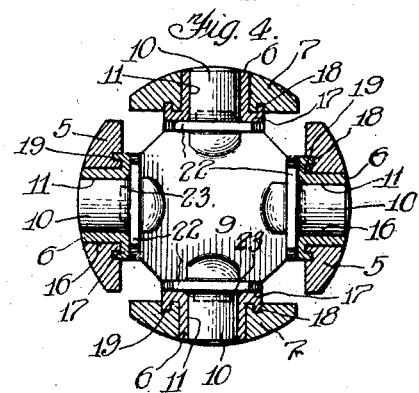
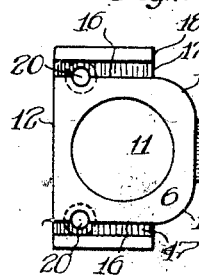
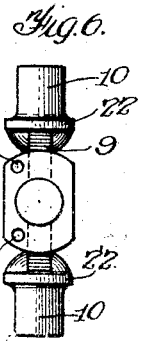
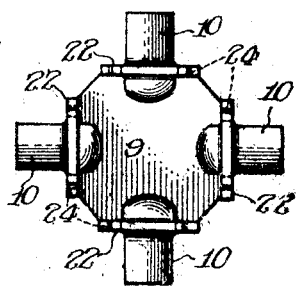
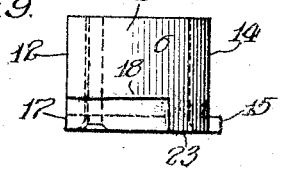
Witnesses:
A. J. Sauser.
M. L. Williams.
Inventor:
William Erastus Williams

UNITED STATES PATENT OFFICE.

WILLIAM ERASTUS WILLIAMS, OF CHICAGO, ILLINOIS.

UNIVERSAL JOINT FOR POWER-SHAFTS.

1,225,199.   Specification of Letters Patent.   Patented May 8, 1917.

Application filed May 24, 1916. Serial No. 99,616.

*To all whom it may concern:*

Be it known that I, WILLIAM ERASTUS WILLIAMS, a citizen of the United States, residing at Chicago, county of Cook, and State of Illinois, have invented a new and useful Improvement in Universal Joints for Power-Shafts, of which the following is a specification.

The object of my invention is to improve the detailed constructions of joints of this character and chiefly as relates to the bearing bushings and the means by which they are fastened in place. The invention is set forth in the claims. I show only the working parts omitting the outside casing.

Figure 1 is a plan of the joint parts assembled but without the casing.

Fig. 2 is side elevation of the devices shown in Fig. 1.

Fig. 3 is a right end elevation.

Fig. 4 is a view partly in section through the plane of the trunnion block.

Fig. 5 is a plan view of the trunnion block.

Fig. 6 is an edge view of the devices shown in Fig. 5.

Fig. 7 is a plan view of one of the bearing bushings.

Fig. 8 is a view looking from the right side in Fig. 7.

Fig. 9 is an end view of the devices shown in Fig. 7.

In the drawing 1 indicates the main flange plate to which a companion flange 2 is bolted, the latter having a socket for a shaft connection indicated by the broken away portion 3.

4 indicates the other shaft socket or connection here shown as the slip end of the joint.

On the main flange 1 there are horns 5 which support the bearing bushings 6.

On the shaft socket 4 there are horns 7 which support the bearing bushings 8. The bushings 8 are the same as bushings 6 and hereinafter all bushings will be indicated by 6.

The trunnion block or pivot block is indicated by 9 and is sometimes called the intermediate piece, or connecting piece. The block 9 is provided with trunnion bearing pins 10 which are integral with the block itself. The trunnions 10 fit into the bearing holes 11 of the bushings 6 or 8.

The bushings are made in peculiar shape having the front face 12 straight and the back face formed with two curved faces 13 and a straight portion 14. A lip 15 is provided on the bottom edge. At the end 16 there are flanges 17 provided with the lips or ribs 18.

The ends of the horns 5 and 7 are shaped to receive the bushings 6 and small grooves 19 in the horns are adapted to receive the ribs or lips 18 on the bushings.

The lips 15 rest on the inside of the horn faces and form shoulders, which with the flange 17 aid in holding the bushings from outward displacement.

The lips or ribs 18 on the ends of flanges 17 being secured in the grooves form ties across the openings in the horns and aid in the strength of the ends.

In assembling the parts the bushings are first put on the trunnions and then bushings, trunnions and all are slid endwise of the horns into the holes in the ends of the horns adapted to receive the bushings and when home small holes 20 are drilled on the line of the ends 16 and the sides of the holes in the horns and small rivets 21 are secured in the holes, thus locking the parts together.

The trunnion block is provided with flanges 22 at the base of the trunnions which work against the bottom faces 23 of the bushings.

In order to get the rivets 21 into place and rivet over their ends I provide the small holes 24 through the flanges 22 of the trunnion block through which I may insert the rivets. The holes at the rivet ends are countersunk to permit the heads and upset ends of the rivets to be below the outside faces of the bushings.

The curved faces 13 of the bushings are made to permit round corners in the notches or holes in the ends of the horns as square corners induce cracking of the steel and weaken the parts.

Joints of this class are subject to severe shocks and it is desirable to have as large a bearing on the ends 16 of the bushings on the horns as possible with a safe or curved corner 13.

At high speed there are developed lateral strains owing to what is called the "whip of the shaft" that tend to bear heavily endwise of the trunnions and act to push the bushing radially out of the horns. The flanges 17 and lips 15 take up this thrust. It would be desirable to have the flanges 17 and lips 15 continuous or one flange but is cut away at the curved portion 13 in order to facilitate the manufacture of the bushings by milling cutters.

In the manufacture of my bushings the bearing hole is drilled in the ordinary way and the outside surfaces are finished by being cut by four passes of double milling cutters, one set cutting at one pass the front face 12 and the straight back portion 14, another set at another pass cutting the ends 16, flanges 17 and lips 18, another set at another pass cutting the curved surfaces 13, the tops and bottoms being the flat sides of the bar out of which the bushings are made and which may be a cold rolled finished bar or made true to size by any suitable means.

What I claim is:

1. A joint of the class described having driving and driven members, provided with suitable shoulders, an intermediate connecting member provided with trunnions having shoulders at their bases and adapted to form hinge connections to the driving and driven members, bearing bushings mounted in the driving and driven members and adapted to serve as journals for the trunnions, said bushings having rectangular cross sections and being provided with flange bases adapted to abut against the shoulders on the driving and driven members and against the shoulders at the bases of the trunnions on the intermediate member, and means for securing the bushings in place.

2. A joint of the class described composed of two forked end members and an intermediate or connecting member, embraced by the forks and having hinge pins or trunnions connecting the members together, bearing bushings for the journals of the hinge pins or trunnions, said bushings having faces of approximately rectangular outline rounded at the rear corners.

3. A joint of the class described composed of two end members and an intermediate or connecting member having hinge pins or trunnions connecting the member together, bearing bushings for the journals of the hinge pins or trunnions, said bushings having faces of approximately rectangular outline rounded at the rear corners and provided with flanges at the base for taking the radial thrust of the connecting member.

4. In a device of the class described, two end members, a third or intermediate member hinged to both, bearing bushings for the hinge journals, said bushings being approximately rectangular in cross section and provided with flanges at their bases adapted to resist radial displacement and to furnish radial wearing surfaces, and being further provided with ribs on the flanges adapted to aid in resisting circumferential displacement and to tie the parts together.

5. In a device of the class described, two end members, a third or intermediate member hinged to both end members, bearing bushings for the hinge journals, said bushings being rectangular in cross section and provided with flanges at their bases adapted to resist radial displacement and to furnish radial wearing surfaces, and being further provided with ribs on the flanges adapted to aid in resisting circumferential displacement and to tie the parts together; and means for fastening the bushings against displacement.

6. In a device of the class described, two end members, a third or intermediate member hinged to both, bearing bushings for the hinge journals, said bushings being rectangular in cross section and provided with flanges at their bases adapted to resist radial displacement and to furnish radial wearing surfaces, and being further provided with ribs on the flanges adapted to aid in resisting circumferential displacement and to tie the parts together; and rivets for securing the bushings from displacement.

7. In a device of the class described, two end members, a third or intermediate member hinged to both end members, bearing bushings for the hinge journals, said bushings being approximately rectangular in cross section, provided with flanges at their bases, adapted to resist radial displacement and to furnish radial wearing surfaces, and with ribs on the flanges, to aid in resisting circumferential displacement and to tie the parts together, said bushings having rounded corners for permitting rounded corners in their seats in the parts.

8. In a device of the class described, the combination with driving and driven members each provided with a terminal fork having terminally open slots in its branches to receive trunnion bearing bushings, of trunnion bearing bushings of approximately rectangular cross section but with two corners rounded; said bushings being provided with bases and flange sections on the bases adapted to resist radial displacement.

9. In a device of the class described, the combination with driving and driven members each provided with a terminal fork having in its branches terminally open slots to receive trunnion bearing bushings, of trunnion bearing bushings adapted to slip into said slots, respectively, and of approximately rectangular cross section but with two corners rounded; said bushings being provided with bases and flange sections on the bases adapted to resist radial displacement, said flange sections being cut away at the rounded corners.

10. In a device of the class described, trunnion bearing bushings approximately rectangular in cross section but with two corners rounded and provided with bases and with flange sections on the bases adapted to resist radial displacement, some of said flange sections being provided with ribs adapted to lock across the bushing seats in the parts.

11. In a device of the class described, trunnion bearing bushings approximately rectangular in cross section but with two corners rounded, and provided with bases and flange sections on the bases adapted to resist radial displacement, some of said flange sections being provided with ribs being adapted to lock across the bushing seats in the parts, the bushings adapted to be entered into their seats in the parts when in place on the journals or trunnions.

12. In a device of the class described, a driving member, a trunnion block and a driven member and bearing bushings for the trunnions, said members being provided with holes or notches in their ends adapted to receive and hold the bearing bushings for the trunnions and open at their mouths the full width of the bushings whereby the parts may be assembled by longitudinal movement when the bushings are seated on the trunnions; with means for fastening the trunnions in their seats.

13. In a device of the class described, a driving member, a trunnion block and a driven member and bearing bushings for the trunnions, said members being provided with holes or notches in their ends adapted to receive and hold the bearing bushings for the trunnions and open at their ends the full width of the bushings whereby the parts may be assembled by longitudinal movement when the bushings are seated on the trunnions, said bushings being provided with flanges on their bases adapted to form a shoulder against the inside of the members.

14. In a device of the class described, a driving member, a trunnion block and a driven member and bearing bushings for the trunnions, said members being provided with holes or notches in their ends adapted to receive and hold the bearing bushings for the trunnions and being open at their ends the full width of the bushings whereby the parts may be assembled by longitudinal movement when the bushings are seated on the trunnions, said bushings being provided with flanges on their bases adapted to form a shoulder against the inside of the members, and with ribs on the flanges adapted to interlock with the members to form a tie across the ends of the holes or notches.

15. In a device of the class described, the combination with terminally recessed driven and driving members and a third member connecting the two, of bearing bushings adapted to be assembled in the driving and driven members when seated on their journals, said bushings being provided with means for engaging the driving and driven members, respectively, and forming a tie across the corresponding terminal recess.

Signed at Chicago, in the State of Illinois, and county of Cook, this 20th day of May, 1916.

WILLIAM ERASTUS WILLIAMS.

Witnesses:
M. L. WILLIAMS,
H. MILLER.